United States Patent [19]
Pound

[11] 3,909,036
[45] Sept. 30, 1975

[54] ROUGH DUTY AIR-SUSPENSION SYSTEM FOR TRUCKS AND THE LIKE

[75] Inventor: Virgil E. Pound, San Jose, Calif.

[73] Assignee: Paccar Inc., Bellevue, Wash.

[22] Filed: Aug. 30, 1974

[21] Appl. No.: 502,045

Related U.S. Application Data

[63] Continuation-in-part of Ser. No. 418,739, Nov. 23, 1973, abandoned.

[30] Foreign Application Priority Data
May 29, 1974 Canada .................. 201119

[52] U.S. Cl. ............... 280/124 F; 267/18; 267/31; 267/56
[51] Int. Cl.² ........................... B60G 11/46
[58] Field of Search ....... 280/124 R, 124 F; 267/17, 267/18, 31, 32, 56

[56] References Cited
UNITED STATES PATENTS

| | | |
|---|---|---|
| 3,237,957 | 3/1966 | Harbers .................. 267/31 |
| 3,309,107 | 3/1967 | Chieger .................. 267/56 X |
| 3,497,028 | 2/1970 | Sampietro .................. 180/71 |
| 3,784,221 | 1/1974 | Fraisier .................. 280/124 F |

*Primary Examiner*—Philip Goodman
*Attorney, Agent, or Firm*—Owen, Wickersham & Erickson

[57] ABSTRACT

A rough duty air-suspension system for trucks and the like wherein a pair of lengthwise radius rods normally retain the axle in place and align it, while a transverse radius rod, or tracking rod, prevents the axle from shifting sideways with respect to the vehicle; at the same time a unified cantilever beam combination of a leaf spring and air spring supports the load. If either of the lengthwise radius rods should break, the leaf spring is provided with a safety hook for preventing serious displacement of the axle. Leaf spring loading is equalized by shims secured between the leaf spring and the truck frame.

6 Claims, 9 Drawing Figures

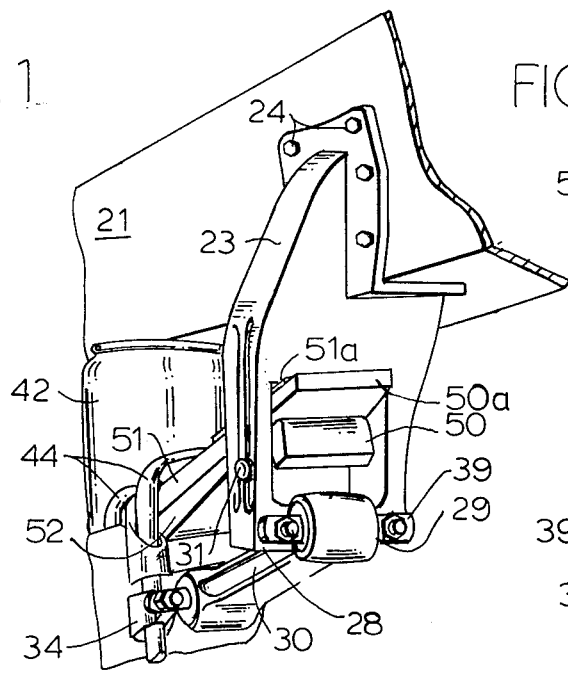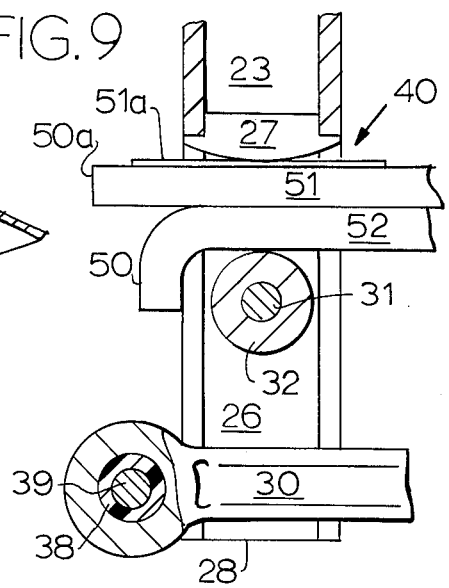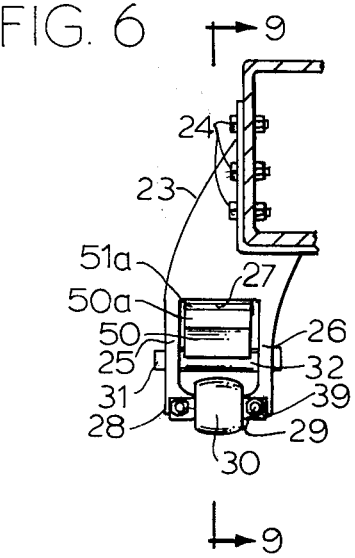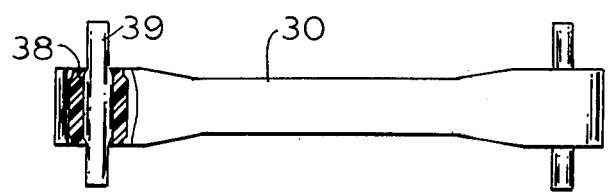

ROUGH DUTY AIR-SUSPENSION SYSTEM FOR TRUCKS AND THE LIKE

BACKGROUND OF THE INVENTION AND ITS OBJECTS

This is a continuation-in-part of application Ser. No. 418,739, filed November 23, 1973, now abandoned.

This invention relates to an air-suspension system for trucks of the kind that are subjected to very rough usage. It applies, for example, to logging trucks, chip haulers, tankers, end dump trucks and other dump trucks, and to vehicles adapted for off-the-highway use, as well as on-the-highway use.

Air-suspension systems used in conjunction with leaf springs are known as an "air leaf" suspension. They were introduced some 5 or 6 years ago and have been quite successful in thousands of on-highway jobs throughout the country in providing a uniformly soft ride with a wide variety of loads. These systems have proven their ability to stand up and give rugged service with relatively little maintenance, even though they are relatively light in weight. They have been used in both tandem and single axle structure.

However, when a vehicle is to be subjected to exceptionally rough duty, such as in off-the-highway logging, chip hauling, dumping, etc., there is a problem related to the fact that the successful air leaf suspension heretofore in use has required the leaf spring to perform several functions, namely: (1) to support the weight, (2) to retain the axle in place lengthwise, (3) to align the axle, (4) to keep the axle from shifting sideways, and (5) to relieve the torque stresses developed in the axle during use, commonly referred to as "axle windup". Under exceptionally rough use it is possible that such a spring might fail due to severe torque or fatigue, even though such springs have a very long life and special care is taken to accommodate these conditions. If such a failure should occur and the spring breaks there is no other mechanism to retain the axle under the truck, and it tends to drop back on the side of the broken spring. This, in turn, disables the vehicle and may divert it from its normal course.

Among the objects of the present invention are to subdivide the above-listed functions of the spring and to assign some of these functions to radius rods while using the spring for its main purpose of supporting the load. It is also an object to provide a structure that is fail-safe. Thus, in the present invention the load-supporting function remains with the spring, but the axle is held in place and aligned longitudinally and axle torque is relieved by a longitudinal radius rod on each side of the axle, while the axle is transversely positioned and kept from shifting sideways by an adjustable tracking rod or transverse torque rod. Another important feature of the invention is that if the radius rod should break, the axle is still held in place by an engagement with the spring itself, which acts temporarily until the damage can be repaired.

SUMMARY OF THE INVENTION

The rough duty air-suspension system of this invention is to be understood as including a pair of suspension assemblies for each axle; however, only one assembly is described herein. A spring support bracket is secured to and depends from one side of the main frame of the truck and forward of the axle. Each bracket has an inverted U-shaped lower end with a wear pad at the upper portion thereof, below the frame, and it has side arms extending down below each side of the wear pad to a lower end. Adjacent the lower end is a radius rod attachment member that bridges the bracket arms; above this is a safety rebound bolt which bridges the same arms in between the radius rod attachment member and the wear pad. Each longitudinal radius rod has one end secured rotatably to an attachment member, and its second end is secured rotatably to the front of the axle housing and aligned in a plane tangent to the top of the housing. A leaf spring for each side of the axle housing has one end bearing upwardly on the wear pad and has its other end clamped to the top of the axle housing and seated in an air spring support member. The air spring support member generally lies rearwardly of the axle to form a unified cantilever beam with the spring and supports the lower portion of the air spring, the upper portion being supported by the vehicle frame. A shock absorber is mounted between each air spring support member and the frame and is aligned generally perpendicular to the frame. An important feature of the invention is that the leaf spring is also provided adjacent the wear pad with an axial extension member and a hook member combination which if the radius rod should break positively retains the axle by a locking engagement with the safety rebound member, which then prevents serious displacement of the axle. Another feature is that leaf spring loading is equalized by placement of shims of a desired thickness between the leaf spring and the wear pad.

An adjustable tracking rod, i.e., a laterally-extending torque rod, has one end rotatably attached to the axle housing near one end of the axle housing and has another end rotatably secured to the frame so as to fix the sideways alignment of the axle as well as transfer transverse forces to the frame.

The air springs are connected in parallel to a common height control valve which equalizes the air pressure and keeps the spring forces the same on each side of the vehicle. This height control valve is controlled by a linkage to the axle housing and the valve has a time delay characteristic that overlooks the transient movements and "bumps" induced in the suspension system by travel of the truck.

Further understanding of the invention will appear from the following description of a preferred form thereof. It will be understood that the invention applies both to tandem axle trucks and to single axle trucks and that it can be used in on-the-highway vehicles and also in off-the-highway vehicles. Also, of course, modifications are feasible in many parts of the device, and the description is that of a presently preferred embodiment and not of the only possible embodiment.

BRIEF DESCRIPTION OF THE DRAWINGS

In the drawings:

FIG. 1 is a view in perspective of a front portion of a truck air-suspension system embodying the principles of the invention.

FIG. 6 is a view in section taken along the line 6—6 in FIG. 2 and is a front end view in elevation of a spring support bracket.

FIG. 7 is a view in perspective looking at the opposite end of the device from that of FIG. 1 and shows the tapered leaf spring seated in the air spring support member.

FIG. 8 is a plan view, partly cut away and shown in section of one of the longitudinal radius rods.

FIG. 9 is an enlarged view in front elevation and section of a spring support bracket and is taken along the line 9—9 in FIG. 6.

DESCRIPTION OF A PREFERRED EMBODIMENT

Figure 2:
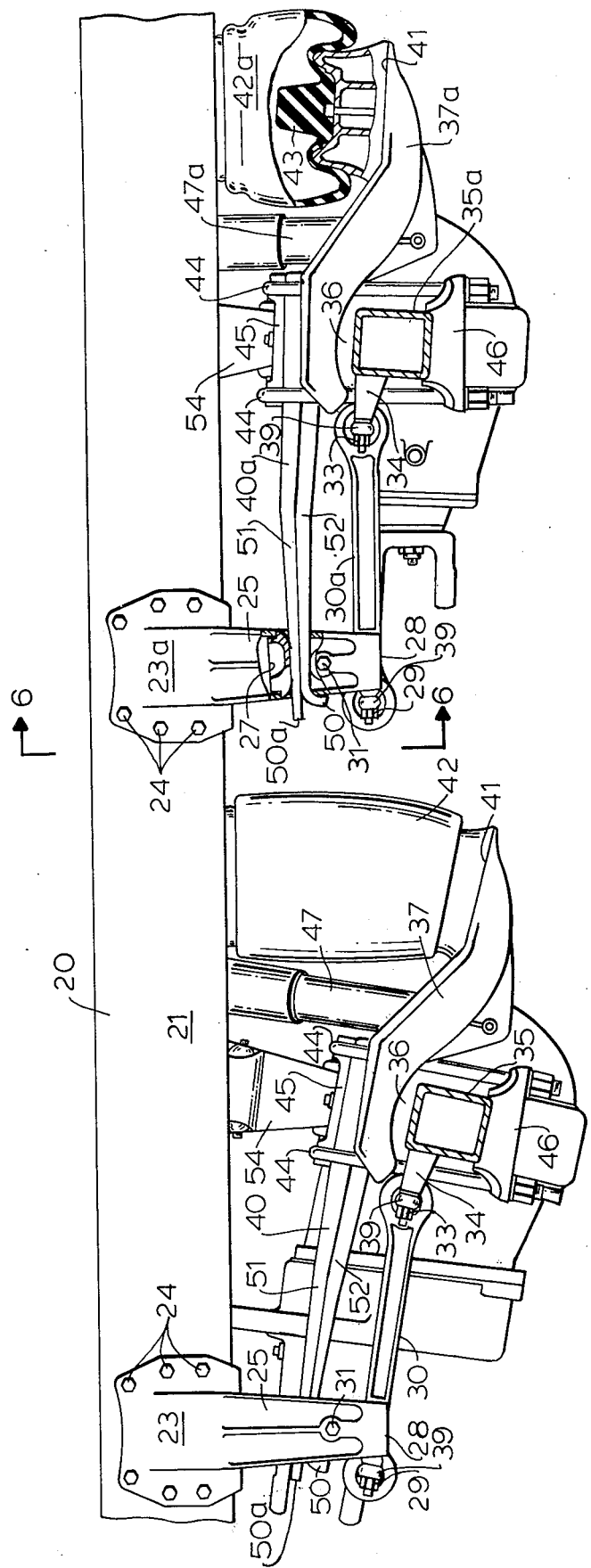
FIG. 2 is a view in side elevation of the truck frame of FIG. 1, showing a tandem axle installation. For purposes of illustration, one air spring is shown at rest and the other is shown fully compressed and partly in section. A spring support bracket is also shown partly in section.
Figure 3:
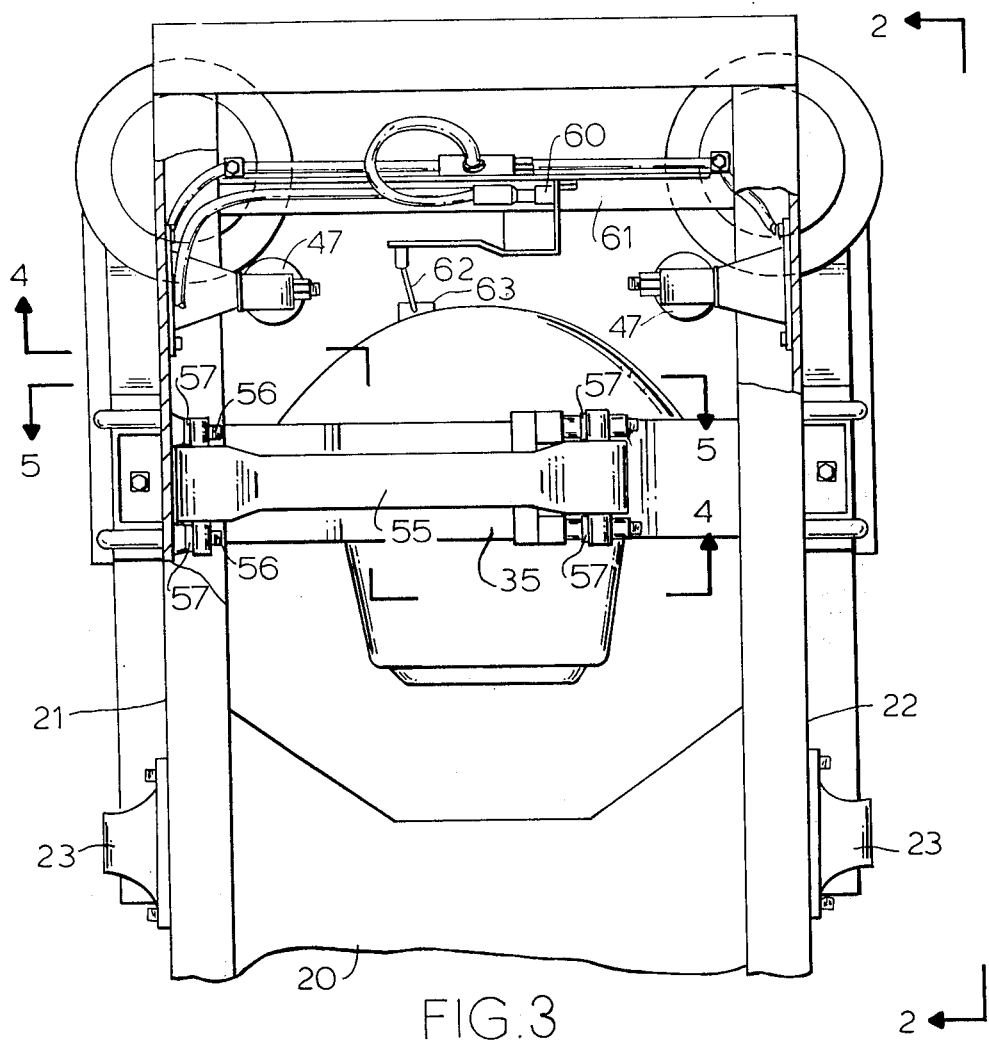
FIG. 3 is a top plan view of a portion of the device of FIG. 2.

A main frame 20 of a truck or other vehicle has two side rails 21 and 22 which extend lengthwise of the truck. To each rail 21 and 22 (in a tandem axle truck) are secured two brackets 23 and 23a, each preferably made from cast steel and firmly attached to the frame as by bolts 24. For a single axle truck there is only one such bracket 23 for each axle end.

Each bracket 23, 23a depends from the frame 20 and is bifurcated into an inverted U-shape at the lower portion therof, having two laterally spaced apart, longitudinally and downwardly extending arms 25 and 26 that extend down below a wear pad 27. Adjacent the lower end 28 of the arms 25 and 26 is an attachment member 29 to which a radius rod 30 (or 30a) is rotatably mounted. In between the end 28 and the wear pad 27 is a safety rebound bolt 31 which extends through a resilient spacer 32.

The other end of the radius rod 30 (or 30a) is rotatably secured by an attachment member 33 to a bracket 34 which is fixed to an axle housing 35 (or 35a) and extending generally radially and longitudinally from the axle housing 35 (or 35a).

The axle housing 35 (or 35a) has a cast steel seat 36 which is preferably welded to it. The seat 36 may be integral with the bracket 34. This seat 36 mounts an air spring support 37 (or 37a) to the top side of the axle housing 35 (or 35a).

The radius rod 30 is preferably a cast aluminum member with a urethane bushing 38 and a steel pin 39 at each end. One of these pins 39 is bolted to the attachment 29 and the other is bolted to the attachment member 33. The radius rod 30 positions and retains the axle housing 35 and therefore the axle. The radius rod also helps to transmit breaking and accelerating forces. These two radius rods 30 (or 30a) for each axle may be termed longitudinal radius rods, to differentiate them from the transverse torque rods referred to later on as tracking rods, and have been found to be most effective for force transmission when secured to a front wall portion of the axle housing 35 (or 35a).

The air spring support 37 (or 37a) is also, preferably, a cast steel member which is bolted into locking engagement around a tapered leaf spring 40 (or 40a). The air spring support 37 (or 37a) extends behind the axle housing 35 (or 35a) to form a unified cantilever suspension on top of the housing 35 (or 35a) and provides a seat 41 for the lower end of an air spring 42 (or 42a) which preferably has a built-in rubber stop 43 as shown in FIG. 2. The stop 43 prevents the suspension components attached to the axle housing 35 (or 35a) from hitting the frame 20 during maximum upward movements of the axle housing 35 (or 35a). The air spring support 37 fits over the axle seat 36 and is clamped in place by U-bolts 44 which fit over a U-bolt saddle 45 mounted on top of the tapered leaf spring 40. The U-bolts 44 go through an axle clamp 46 on the bottom of the axle housing 35. The use of the unified cantilever suspension of the tapered leaf spring 40 (or 40a) locked to the air spring support 37 (or 37a) provides a significantly stronger suspension than would be obtained if the support 37 were clamped to the bottom of the axle housing 35.

Figure 4:
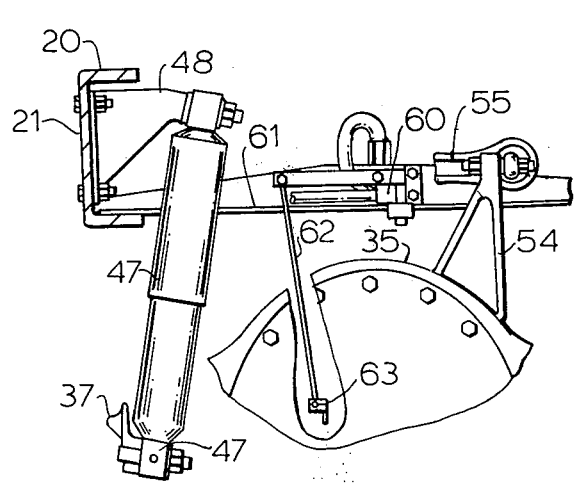
FIG. 4 is a view in elevation and in section taken along the line 4—4 in FIG. 3, showing the shock absorber. The tracking rod and axle housing are partly broken away to show the height adjustment linkage and control valve.
Figure 5:
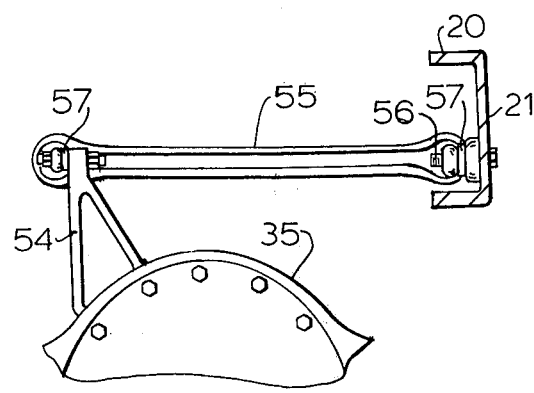
FIG. 5 is a view in elevation and in section taken along the line 5—5 in FIG. 3, showing the tracking rod.

The air spring support 37 (or 37a) also provides an attachment for a telescoping shock absorber 47 (or 47a). The upper end of the shock absorber 47 is secured to a bracket 48 which is bolted to the frame 20 (FIG. 4). The shock absorber 47 (or 47a) is aligned to telescope generally at right angles with the frame 20 and along the locus of movement of the support 37 (or 37a) so as to be effective over the entire range of movement of the axle housing 35.

The front end of each tapered leaf spring 40 has a formed safety hook 50 in combination with an axial extension 50a adjacent the wear pad 27. The leaf spring 40 may be in composite with an upper leaf 51 and a lower leaf 52, extends downwardly, and is normally spaced forward away from the safety rebound bolt 31, coming back against it only in case of a failure of the radius rod 30. The axial extension 50a is the end portion of the upper leaf 51 and extends beyond the wear pad 27 for a predetermined distance.

Thus, if the radius rod 30 should break, the axle would be prevented from dropping back and the hook 50 would be prevented from unwinding around the safety rebound bolt 31 by the extension 50a. This is an important safety feature. Note that the leaf spring 40 does not ordinarily have anything to do with the alignment or positioning of the axle housing 35, but that in this emergency situation, it does, by maintaining proper alignment securely and safely until the radius rod 30 is replaced, which of course should be done as soon as possible.

To provide equalized uniform static loading of each spring, a shim 51a as shown in FIGS. 1, 6, 7, and 9 may be positioned between the wear pad 27 and the portion of the upper leaf 51 adjacent thereto. The shim 51a may be of a range of predetermined desired thicknesses to handle a variety of tolerances, and for some suspension assemblies such as those of FIG. 2 no shim might be required at all. The shim 51a is fixed to the top surface of the upper leaf 51 typically by welding.

A cast steel bracket 54 may be welded to the top of the axle housing 35 to enable attachment of a cast aluminum tracking rod, or transverse radius rod 55. The rod 55 is secured at one end to the bracket 54 and at the other end to the frame 20, as by a pair of bolts 56. It is basically the same in structure as the rod 30. The function of this rod 55 is to align the axle under the truck and to transmit the transverse forces into the frame 20. Spacers 57 are inserted between the tracking rod 55 and the bracket 54 at one end and the frame 20 at the other to adjust the transverse alignment of the axle housing 35 relative to the frame 20. Similar spacers (not shown) are similarly inserted between the radius rod 30 and the bracket 34 or the attachment member 29, to enable adjustment.

The frame 20 is maintained at a constant height by the air springs 42 by means of a valve 60 which may be attached to a cross member 61 between the two rails 21 and 22 of the frame 20. A link 62 runs between the valve 60 and a bracket 63 on the axle housing 35. Air is delivered and exhausted from the air spring 42 to keep the height constant in accordance with the conventional systems. The valve 60 is connected to all of the air springs 42 to equalize pressures. In addition a time delay mechanism in the valve 60 overlooks transient axle movements and ordinary bumps in maintaining a constant height and a cushioned ride. Operation of the air spring suspension need not be explained since it is conventional. It will suffice to point out that in the present invention, the longitudinal radius rods 30 and 30a, of which there are two for each axle, perform the function of retaining the axle housing 35 (or 35a), in place longitudinally and aligning it longitudinally, while the transverse tracking rod 55, keeps the axle housing 35 from shifting sideways, thereby retaining it in place and aligning it laterally as well as transmitting lateral forces to the frame 20. If one of the longitudinal radius rods 30 should break, then the hook portion 50 of the leaf spring 40 engages the safety rebound member 31 and prevents one side of the axle from dragging relatively to the other. Simultaneously, the extension portion 50a engages the wear pad 27 to prevent the hook portion 50 from unwinding around the safety rebound member 31. The driver should, of course, attend to seeing that the broken radius rod is repaired as soon as it can be done, but this safety feature greatly lowers the risk of anything serious happening to the truck as the result of this breakage of the radius rod 30.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A rough duty air-suspension system for trucks and the like, including in combination:

a main frame for said truck;

an axle housing positioned under said frame and transversely thereto and having two axle ends each adapted to mount a wheel;

an adjustable tracking rod pivotally mounted between said axle housing and the frame and aligned to maintain the lateral position of said axle housing relative to the frame;

a spring support bracket for each axle end secured to and depending from said frame at a spaced distance in front of said end and having a wear pad in a middle portion and two sidearms extending downwardly from the ends of said wear pad to a lower end of said bracket;

radius rod attachment means at the bottom of each said bracket;

a safety rebound member bridging the sidearms of each said bracket and mounted generally between said wear pad and said lower end;

a radius rod for each axle end having a forward end pivotally secured to said bracket at said radius rod attachment means and having a rear end;

a spring seat secured on top of each said axle end and generally aligned under said frame and having a radius rod attachment member to which the rear end of a said radius rod is pivotally mounted;

a tapered leaf spring for each said axle end having a front end portion extending through the sidearms of a said bracket with a top leaf engaging said wear pad and a bottom leaf adjacent to said safety rebound member, and having a back end extending to a said spring seat;

a safety catch at the front end of each said tapered leaf spring adapted to engage the safety rebound member and wear pad of the bracket mounting said spring in the event that the radius rod secured to said bracket should break;

a rigid air spring support member clamped to the back end of each said tapered leaf spring and to each said axle end by a said spring seat and extending axially therefrom away from said seat to form a unified suspension cantilever and providing an air spring rest;

an air spring for each axle end having one end secured to the frame and another end on a said rest and pneumatically connected in parallel with each other air spring and to a source of air pressure;

a height control valve means connected between said air pressure source and all said air springs for employing said air pressure to maintain a predetermined distance between the axle housing and main frame while the loading of said truck is varied;

a shock absorber adjacent to each said air spring and pivotally mounted to the member supporting said air spring and to the frame and aligned to compress generally along the locus of movement of said cantilever.

2. In a vehicle axle suspension of the kind in which each end of an axle member is supported by a mechanical leaf spring on one side of the axle member and by an air spring on the other side of the axle member, the improvement comprising:

leaf spring mounting means for permitting some longitudinal movement of each leaf spring with respect to the vehicle;

radius rod means pivotally connected to the axle member and the vehicle for retaining each of the axle member in longitudinal position with respect to the vehicle, the vehicle including a frame and the radius rod means including a radius rod at each end of the axle member and each having a first pivotal connection to the vehicle frame and a second pivotal connection to the axle member; and engageable safety catch means in said leaf spring and said leaf spring mounting means to limit longitudinal movement of the end of the axle member in the event of disconnection of said radius rod means;

the leaf spring comprising a tapered leaf spring axially secured to a rigid air spring support member and mounted on top of the end of a said axle member to form a unified suspension cantilever.

3. The invention defined in claim 2 including shock absorber means pivotally connected between the vehicle and the axle member on the same side of the axle member as the air spring and aligned to compress generally along the locus of movement of said cantilever relative to said frame.

4. The invention defined in claim 2 including adjustable lateral tracking rod means connected between the axle member and the vehicle for retaining the axle member in lateral position with respect to the vehicle.

5. The invention defined in claim 2 wherein said safety means are disengaged so long as the radius rod means are effective to retain each end of the axle member in said longitudinal position with respect to the vehicle.

6. The invention defined in claim 2 wherein the unloaded engagement of each tapered leaf spring with each corresponding mounting means is accomplished by securing shims between the leaf spring and the mounting means.

* * * * *

UNITED STATES PATENT AND TRADEMARK OFFICE
CERTIFICATE OF CORRECTION

PATENT NO. : 3,909,036
DATED : September 30, 1975
INVENTOR(S) : Virgil E. Pound

It is certified that error appears in the above-identified patent and that said Letters Patent are hereby corrected as shown below:

Item [73], left-hand column of first page, "Paccar Inc." should read --PACCAR Inc--.

Item [30], left-hand column of first page, delete Item [30] in its entirety.

Column 6, line 49, which is line 10 of claim 2, "retaining each of the" should read --retaining each end of the --.

Signed and Sealed this tenth Day of February 1976

[SEAL]

Attest:

RUTH C. MASON
Attesting Officer

C. MARSHALL DANN
Commissioner of Patents and Trademarks